(12) United States Patent
Calonius et al.

(10) Patent No.: US 9,970,409 B2
(45) Date of Patent: May 15, 2018

(54) ADAPTIVE HYDRAULIC PRESSURE GENERATOR

(71) Applicant: AALTO UNIVERSITY FOUNDATION, Aalto Helsinki (FI)

(72) Inventors: Olof Calonius, Kauniainen (FI); Juha Elonen, Nummela (FI); Heikki Eskonen, Helsinki (FI); Jyrki Kajaste, Vihti (FI)

(73) Assignee: Aalto University Foundation, Aalto Helsinki (FI)

( * ) Notice: Subject to any disclaimer, the term of this patent is extended or adjusted under 35 U.S.C. 154(b) by 193 days.

(21) Appl. No.: 14/386,493

(22) PCT Filed: Mar. 20, 2013

(86) PCT No.: PCT/FI2013/050315
§ 371 (c)(1),
(2) Date: Sep. 19, 2014

(87) PCT Pub. No.: WO2013/140042
PCT Pub. Date: Sep. 26, 2013

(65) Prior Publication Data
US 2015/0104332 A1    Apr. 16, 2015

(30) Foreign Application Priority Data

Mar. 20, 2012   (FI) ...................................... 20125306

(51) Int. Cl.
*F03B 13/18*    (2006.01)
*F15B 3/00*     (2006.01)
*F04B 5/00*     (2006.01)

(52) U.S. Cl.
CPC ........ *F03B 13/1875* (2013.01); *F03B 13/187* (2013.01); *F03B 13/189* (2013.01);
(Continued)

(58) Field of Classification Search
CPC .. F03B 13/1875; F03B 13/187; F03B 13/189; F03B 13/14; F03B 13/16; F03B 13/18;
(Continued)

(56) References Cited

U.S. PATENT DOCUMENTS

| 4,002,416 A * | 1/1977 | Axford ................. F03B 13/182 185/30 |
| 4,466,244 A | 8/1984 | Wu |

(Continued)

FOREIGN PATENT DOCUMENTS

| WO | WO 2009/153329 | 12/2009 |
| WO | WO 2009153329 A2 * | 12/2009 .............. F03B 13/20 |
| WO | WO 2011/079267 | 6/2011 |

*Primary Examiner* — Charles Freay
*Assistant Examiner* — Christopher Brunjes
(74) *Attorney, Agent, or Firm* — Womble Bond Dickinson (US) LLP

(57) ABSTRACT

An adaptive hydraulic pressure generator is provided for systems in which the mechanical force producing energy varies significantly, especially for wave energy systems. The pressure generator includes at least two fluid chambers with a piston surface/displacement surface arranged to reciprocate with the fluid chamber, whereby the piston surface/displacement surface acts on the fluid in the chamber by means of the said mutual reciprocating movement. The pressure generator is equipped with a control system which is arranged to connect the chambers to each other and/or to different pressure ducts in such a way that the effective area of the piston/displacement surfaces changes in accordance with the changes in the driving force exerted on the piston/displacement surfaces and/or the body forming the fluid chamber in such a way that the pressure produced by the pressure generator in the fluid supplied to the application exceeds the threshold pressure.

14 Claims, 13 Drawing Sheets

(52) U.S. Cl.
CPC .................. *F04B 5/00* (2013.01); *F15B 3/00*
(2013.01); *Y02E 10/38* (2013.01)

(58) Field of Classification Search
CPC .......... F03B 13/20; F04B 5/00; F04B 19/022;
F04B 19/22; F04B 39/122; F04B
39/0016; F04B 7/02; F04B 7/0003; F04B
7/0208; F04B 7/04; F04B 3/00; F04B
13/00; F04B 53/148; F04B 35/004; Y02E
10/38; F15B 3/00
See application file for complete search history.

(56) References Cited

U.S. PATENT DOCUMENTS

| | | | |
|---|---|---|---|
| 6,109,036 A | 8/2000 | Koike et al. | |
| 2003/0078697 A1* | 4/2003 | Kockemann | F15B 21/08 |
| | | | 700/282 |
| 2004/0007881 A1 | 1/2004 | Kobashikawa et al. | |
| 2005/0019180 A1* | 1/2005 | Seto | F04B 23/06 |
| | | | 417/413.1 |
| 2009/0317267 A1* | 12/2009 | Gill | F15B 3/00 |
| | | | 417/53 |
| 2011/0056368 A1 | 3/2011 | McBride et al. | |

* cited by examiner

ADAPTIVE HYDRAULIC PRESSURE GENERATOR

FIELD OF THE DISCLOSURE

The present invention relates to an adaptive hydraulic pressure generator for systems in which the mechanical force producing energy varies significantly, especially for wave energy systems.

SUMMARY OF THE DISCLOSURE

In wave energy systems, the primary mechanical power is often in the form of reciprocating linear movement, which is converted into hydraulic pressure by means of pistons in cylindrical chambers. The problem with the various systems converting wave power into mechanical energy is that the power generated by the wave power plants is irregular, regarding both the speed of movement and force. This is due to both the hydrodynamics of the waves themselves and the construction of the wave power plant used. Over a longer time span, the power levels produced by the wave power plant also vary in accordance with the intensity of the waves. Power generation is thus varying by nature.

When converting the mechanical energy obtained from a wave power plant into hydraulic energy, due to the variation in the power output of the wave power plant, also the volume flow and pressure of the hydraulic system are pulsating. If the hydraulic energy is to be converted into electrical energy by means of turbines or hydrostatic motors, the pulsating pressure will cause problems to the controlling of the system. Varying pressures weaken the efficiency of the system, because high efficiency is only achieved within a small operating range close to the design point of the system. At the extreme ends of the operating range, that is, during weak waves, the production of electricity may remain non-existent, but during strong waves, on the other hand, a part of the power may have to be led out of the hydraulic system through a pressure relief valve. This means considerable power losses.

In wave energy systems, the primary energy can also be used for making fresh water (for example) by reverse osmosis, instead of producing electricity. This is a very straightforward and integrated system solution, because the hydraulic system takes care of both power and material (saline water) transfer. In the said system, the reverse osmosis process itself constitutes a considerable control-technical challenge, because getting water through semipermeable membranes requires that the system pressure must always exceed the osmotic pressure of the water. The said value depending on the salinity of the water is thus a threshold pressure which must be exceeded in order to be able to start the actual process. On the other hand, excessively high pressures may also cause problems and thus the hydraulic system of a reverse osmosis plant should include a possibility for pressure regulation in order to be able to start the process also with low wave intensities, and for its energy and material balance to be optimal with nominal and greater wave intensities.

Due to the construction of wave power plants, the power they produce is typically reciprocating linear movement. A natural and, therefore, common actuator for producing pressure energy in wave energy concepts is a linear pump (a single-cylinder piston pump), which resembles a hydraulic cylinder in construction. Where the hydraulic cylinder is a linear motor which converts hydraulic power into mechanical power, the operation of the hydraulic linear pump is the opposite. Solutions resembling a hydraulic cylinder are reliable and their efficiency is good if gasket frictions and leaks can be limited to a low level with appropriate gasket solutions. A single-cylinder piston pump is, however, a component with non-existent adjustability; the pressure produced follows linearly the power input to it and the volume flow follows similarly the speed of movement of the piston.

The aim of the present invention is to provide a solution for applications in which mechanical power is supplied to the system in the form of linear movement and is converted into pressure energy according to the displacement principle, that is, by changing the volume of the pressure chambers by means of movement directed at the pressure generator. The pressure chambers comprise a piston/displacement surface, that is, a fluid displacing surface, which pressurises the fluid. The solution can also be implemented in a situation where the mechanical power is supplied to the system in the form of a rotary movement, in which case the pressure chambers described below would be implemented with a torque motor construction. The solution makes it possible to expand the useful wave intensity range of wave energy in such a way that a pressure exceeding the threshold pressure is obtained even in weak waves, and on the other hand, the energy of stronger waves can also be optimally utilised.

To achieve this aim, the adaptive pressure generator according to the invention is characterised in that the pressure generator is equipped with a control system which is arranged to connect pressure chambers to each other and/or with different pressure ducts in such a way that the effective area of the piston/displacement surfaces changes in accordance with the changes in the mechanical driving force exerted on the piston/displacement surfaces and/or on the body forming the fluid chamber in such a way that the pressure produced by the pressure generator in the fluid supplied to the application exceeds the threshold pressure. The threshold pressure may be variable, for example, the threshold pressure required in an RO-system may conceivably be controlled on the basis of salinity.

The method according to the invention is in turn characterised in that in the method, the pressure produced by the pressure generator in the pressure duct is measured, which pressure value is entered in the control logic of a control valve system connected to the pressure generator, which performs an adaptation algorithm on the basis of which the control logic connects the pressure chambers to each other and with different pressure ducts in such a way that the effective area of the piston surfaces changes in such a way that the pressure produced by the pressure generator in the fluid supplied to the application exceeds the threshold pressure.

The adaptive pressure generator according to the invention consists of a multichamber medium (fluid) pressurising unit and of a control system connected to it which is comprised of a control valve system and a control logic. The pressurising unit also functions in an unadaptive basic mode without a control system. The system converts the mechanical operating energy changing as a function of time into hydraulic or pneumatic energy in pressure chambers via pistons and/or displacement surfaces. The operating energy is supplied to the pressurising unit by means of mechanical driving force F. The driving force F may be exerted on either the piston rod or, for example, the cylindrical body under pressure, or both. In a solution implemented according to the torque motor principle, the operating energy is supplied by the driving moment T. Applications of the adaptive hydraulic pressure generator according to the invention are, among others, supplying seawater into a reverse osmosis system to produce fresh water or to filter/purify sea water, pumping water to a specific lifting height, etc.

DRAWINGS

The invention is described in greater detail in the following, with reference to the accompanying drawings, in which:

FIG. 1 shows a diagrammatic view in principle of an embodiment of the adaptive pressure generator according to the invention, FIGS. 2-4 show some diagrammatic examples of embodiments of the control valve system, FIGS. 5-6 show the effective areas of different connection states, FIGS. 7-8 show examples of different connections, FIG. 9 shows a control example as a block diagram, FIGS. 10-16 show an embodiment of the pressure generator according to the invention implemented as a torque pressure generator,

DETAILED DESCRIPTION OF THE DISCLOSURE

The object of the invention is a pressure generation system which adapts to a varying driving force, wherein by means of pressure chamber connection system and a control logic is obtained a desired threshold pressure. The pressure is generated by the displacement principle; the volume of the chamber changes, whereupon the pressure of the pressure medium therein changes. The adaptation of the system pressure takes place by connecting the pressurised chambers of the device either to each other, to a low-pressure duct, a pressure duct, a system duct or an external pressure duct (FIG. 1). The control system takes care of the connections. In this application, connection means that a flow from one chamber to another is made possible, for example, by opening the appropriate valve.

FIG. 1 shows diagrammatically an example of an adaptive pressure generator. On the left side is a four-chamber pressure generator 10 comprising pressure chambers 11, 12, pistons 13, 14 and piston rods 15-17, to which the driving force F is supplied. The pressure chambers are typically circular cylinders in cross-section, but they may also have a different cross-sectional shape, for example, elliptic, triangular or square, the corners of which are preferably rounded for sealing purposes. The pressure chambers 11, 12 are divided into an upper chamber space and a lower chamber space, where reference marking A1y indicates the piston area acting on the upper chamber space of pressure chamber 11, reference marking A1a indicates the piston area acting on the lower chamber space of pressure chamber 11, reference marking A2y indicates the piston area acting on the upper chamber space of pressure chamber 12 and reference marking A2a indicates the piston area acting on the lower chamber space of pressure chamber 12. Reference numeral 31 indicates a pressure sensor placed inside a chamber.

On the right side is depicted a control system and control logic 18 by means of which is connected the type of combination of the pressurised areas A1y-A2a of the pistons (effective area) that the desired threshold pressure is obtained. In FIG. 1, reference numeral 19 indicates a pressure accumulator, reference numeral 20 a check valve, reference numeral 21 a pressure relief valve and reference numeral 24 a container. The pressure duct is indicated by reference numeral 25, the system duct by reference numeral 26, the external pressure duct by reference numeral 27 and the low-pressure duct by reference numeral 28. In Table 1 are shown the other markings used in the description of the apparatus.

TABLE 1

| | Markings and symbols. |
|---|---|
| $A_{1y}$ | Pressurised piston area in chamber 11, upper part in FIG. 1 |
| $A_{1a}$ | Pressurised piston area in chamber 11, lower part in FIG. 1 |
| $A_{2y}$ | Pressurised piston area in chamber 12, upper part in FIG. 1 |
| $A_{2a}$ | Pressurised piston area in chamber 12, lower part in FIG. 1 |
| $A_{eff}$ | Effective area |
| F | Force (driving force) |
| T | Driving moment |
| n | Value on cycle revolution counter (number of stabilisation cycle) |
| N | Number of stabilisation cycles |
| p | Pressure |
| p_threshold | Threshold pressure |
| p_measured | Measured pressure |
| W | Energy produced by pressure generator |
| W_measured | Measured energy |

FIGS. 2-4 depict, as diagrammatic views in principle, some examples of the control valve system included in the control system 18 as embodiments equipped with two and three cylinder chambers. The cylinder chambers are preferably connected successively, as are the cylinder chambers 11 and 12 in FIG. 1, but they may also be separate cylinder chambers. Each cylinder chamber is preferably divided into two chamber spaces in the same manner as cylinder chamber 11 or 12 in FIG. 1.

FIG. 2 shows the first embodiment of the control valve system. The control valve system may include, for example, the following functions:

Check valve function (free flow in one direction, closed in the other). The check valve function 211 connected to the low-pressure duct 28 allows free flow from the low-pressure duct to the cylinder chamber 201, 202. The check valve function 212 connected to the pressure duct 25 allows free flow from the cylinder chamber 201, 202 to the pressure duct. The flow duct can be opened and closed externally between the cylinder chamber and the low-pressure duct by means of valve function 213 and between the cylinder chamber and pressure duct 25 by means of valve function 214. The external control may be, for example, manual, electric, electromagnetic, hydraulic, pneumatic or the like. Reference numeral 26 denotes a system duct by means of which hydraulic pressure is supplied to application, for example, a reverse osmosis plant.

FIG. 3 shows a second embodiment of the control valve system. This alternative control valve system may comprise, for example, the following functions:

Check valve function (free flow in one direction, closed in the other). The check valve function 311 connected to the low-pressure duct 28 allows free flow from the low-pressure duct to the cylinder chamber 301, 302, 303 and the check valve function 312 connected to the pressure duct 25 allows free flow from the cylinder chamber 301, 302, 303 to the pressure duct 25. The flow duct can be opened and closed externally between the cylinder chamber and the low-pressure duct by means of valve function 313 and between the different cylinder chambers by means of valve function 314. The external control may be, for example, manual, electric, electromagnetic, hydraulic, pneumatic or the like.

FIG. 4 shows a third embodiment of the control valve system. This alternative control valve system may further comprise, for example, the following functions:

Check valve function (free flow in one direction, closed in the other). The check valve function 411 connected to the low-pressure duct 28 allows free flow from the low-pressure duct 28 to the cylinder chamber 401, 402, 403. The check valve function 412 connected to the pressure duct 25 allows free flow from the cylinder chamber 401, 402, 403 to the pressure duct 25. The flow duct can be opened and closed externally between the different cylinder chambers by means of valve function 413. The external control may be, for example, manual, electric, electromagnetic, hydraulic, pneumatic or the like. In this version of the control system there may be limitations with respect to achieving every possible connection state between the cylinder chambers.

By means of the control system, the pressure chambers can be connected either to the system duct, the external pressure duct, to other pressure chambers or to a low-pressure duct.

In the following is described an example of the connections of a four-chamber pressure generator, when the chamber is connected either to a pressure duct or low-pressure duct. In the example are described the states which can be realised when the effective areas $A_{eff}$ corresponding to the connections are arranged into a discrete distribution according to increasing area. A state refers to a plurality of active valve connections and the effective area $A_{eff}$ corresponding to it. In this example, the pressure chambers are connected either to the pressure duct (1) or to the low-pressure duct (0).

The value of an effective area is formed in such a way that the pressurised piston area directed in the direction of movement, which reduces the volume of the pressure chamber in the direction M1 of the relative movement between the pistons and the body, thus increasing pressure, is considered to have a positive sign, and similarly, the pressurised piston area directed in the direction of movement, which increases the volume of the pressure chamber and thus lowers the pressure, is considered as a negative area. If pressurised chambers are connected to one another, the said areas directed in the direction of movement are added up and the effective area of the combination is obtained. If the effective area is positive, the system increases the pressure in the direction of movement M1, and if the effective area is negative, the system aims to decrease pressure in the direction of movement M1, but to increase pressure as the pistons move in the opposite direction with respect to the body, that is, in the direction of movement M2. If a flow duct is opened into the pressure duct, for example, by means of a valve, by means of connection combinations with a positive effective area, pressure can be generated and increased pressure when operating in the direction of movement M1, and by means of connection combinations with a negative effective area, pressure can be generated and increased when operating in the direction of movement M2. Should the value of the effective area be zero, the system will not generate pressure when operating in either direction.

Table 2 shows the connections of a four-chamber pressure generator and Table 3 shows a numerical example in which the effective areas are arranged by increasing area values. In the example, the areas are selected in such a way that they increase almost linearly with the states. With this almost linear distribution, the change in effective area is almost the same when moving from one state to another. If a different distribution is desired, it is possible by selecting the pressurised areas (in the example A1y, A1a, A2y, A2a) differently.

FIG. 5 shows the effective areas corresponding to the connections shown in Table 2, and FIG. 6 shows the discrete distribution of effective areas after sorting by the size of the areas.

When the next state is selected in the control algorithm (see control of apparatus below), proceeding to the next point takes place by discrete distribution.

TABLE 2

Connections of a four-chamber pressure generator.

| Connection | A1y | A1a | A2y | A2a |
|---|---|---|---|---|
| 0 | 0 | 0 | 0 | 0 |
| 1 | 1 | 0 | 0 | 0 |
| 2 | 1 | 1 | 0 | 0 |
| 3 | 1 | 0 | 1 | 0 |
| 4 | 1 | 0 | 0 | 1 |
| 5 | 1 | 1 | 1 | 0 |
| 6 | 1 | 1 | 0 | 1 |
| 7 | 1 | 0 | 1 | 1 |
| 8 | 1 | 1 | 1 | 1 |
| 9 | 0 | 1 | 0 | 0 |
| 10 | 0 | 1 | 1 | 0 |
| 11 | 0 | 1 | 0 | 1 |
| 12 | 0 | 1 | 1 | 1 |
| 13 | 0 | 0 | 1 | 0 |
| 14 | 0 | 0 | 1 | 1 |
| 15 | 0 | 0 | 0 | 1 |

1 Chamber connected to pressure line/duct
0 Chamber connected to low-pressure duct

TABLE 3

Numerical example. Effective areas of a four-chamber pressure generator.

| A1y | A1a | A2y | A2a | Aeff |
|---|---|---|---|---|
| 1.1 | 3.1 | 4.6 | 3.6 | |
| 0 | 0 | 0 | 0 | 0 |
| 1.1 | 0 | 0 | 0 | 1.1 |
| 1.1 | −3.1 | 0 | 0 | −2 |
| 1.1 | 0 | 4.6 | 0 | 5.7 |
| 1.1 | 0 | 0 | −3.6 | −2.5 |
| 1.1 | −3.1 | 4.6 | 0 | 2.6 |
| 1.1 | −3.1 | 0 | −3.6 | −5.6 |
| 1.1 | 0 | 4.6 | −3.6 | 2.1 |
| 1.1 | −3.1 | 4.6 | −3.6 | −1 |
| 0 | −3.1 | 0 | 0 | −3.1 |
| 0 | −3.1 | 4.6 | 0 | 1.5 |
| 0 | −3.1 | 0 | −3.6 | −6.7 |
| 0 | −3.1 | 4.6 | −3.6 | −2.1 |
| 0 | 0 | 4.6 | 0 | 4.6 |
| 0 | 0 | 4.6 | −3.6 | 1 |
| 0 | 0 | 0 | −3.6 | −3.6 |

TABLE 4

States obtained by sorting the effective areas in Table 3 by order of magnitude.

| State | Aeff_sort | Connection |
|---|---|---|
| 0 | −6.7 | 11 |
| 1 | −5.6 | 6 |
| 2 | −3.6 | 15 |
| 3 | −3.1 | 9 |
| 4 | −2.5 | 4 |
| 5 | −2.1 | 12 |
| 6 | −2 | 2 |
| 7 | −1 | 8 |
| 8 | 0 | 0 |
| 9 | 1 | 14 |
| 10 | 1.1 | 1 |

TABLE 4-continued

States obtained by sorting the effective
areas in Table 3 by order of magnitude.

| State | Aeff_sort | Connection |
|---|---|---|
| 11 | 1.5 | 10 |
| 12 | 2.1 | 7 |
| 13 | 2.6 | 5 |
| 14 | 4.6 | 13 |
| 15 | 5.7 | 3 |

Connection Examples

Connection examples of the embodiment of FIG. 1 are illustrated in FIG. 7, which shows only the connections without active valves. In FIG. 7, example (a), the topmost chamber generates pressure (area A1y), Table 2 connection 1 and Table 4 state 10. In example (b), the chambers above both pistons generate pressure (A1y and A2y, State 15). In example (c), the three topmost chambers are connected to the pressure duct (State 13). In example (d), all chambers are connected to the pressure duct and the direction of movement M2 is down (State 7). In FIG. 7d, the direction of movement of the piston rod is down M2, whereas in the other partial pictures it is up M1. This is due to the fact that the effective area of the state of FIG. 7d (State 7, Table 4) is negative, which means that the pressure (compared to the pressure of the low-pressure duct) can only be increased by a downward movement of the piston rod. The upward movement decreases the pressure of the chambers (and may result in the vaporization of the liquid in a system filled with liquid). FIG. 8 shows the valves which are active in the connections of FIG. 7c, in a case where the pressure duct is connected to a reverse osmosis system (RO=reverse osmosis).

Control of the Apparatus

Detailed control of the apparatus can be carried out in different ways depending on the instrumentation used. Below are described two examples, one of which is based on the pressure measurement of the pressure duct alone, and the other is based on measuring the speed of movement and chamber pressures, in addition to measuring the pressure of the pressure duct. Irrespective of the instrumentation, the basic idea in control is that if the driving force F decreases, the effective area $A_{eff}$ is reduced so that the pressure produced by the pressure generator will exceed the threshold pressure. Similarly, if the driving force increases, the effective area $A_{eff}$ is increased so that the pressure generated will still exceed the threshold pressure. This threshold pressure may be, for example, the osmotic pressure required by the reverse osmosis apparatus used for producing fresh water. The primary aim of control is thus that the system will be able to exceed the given threshold pressure. This is ensured by the primary control algorithm. Secondary aims are achieved by using an adaptation algorithm, by means of which can be ensured, for example, that the energy balance of the system is optimal.

Control Example 1

Main Function:

The pressure p of the pressure duct is compared with the threshold pressure p_threshold required by the system.

If p<p_threshold, the effective area is decreased by selecting the previous 'smaller' state of state distribution.

If p>p_threshold, the effective area is increased by selecting the next 'larger' state of state distribution according to the adaptation algorithm explained below.

Most Important Stages:

1. Control, the control values are set in the memories (e.g. state memory, movement direction memories, delay basis memory, delay value memory and decrement, see FIG. 9)
  a. Initialisation: initial values are set as control values
  b. Free cycle: as control values is set a state making a free cycle possible
2. Identification of the direction of movement with a MOVEMENT DIRECTION DETECTOR
3. Identification of a change in the direction of movement and the cycle counter is reduced, if the basis for the delay is based on the cycle
4. Connecting the state
  a. The first time
   i. e.g. the smallest (movement direction dependent) state (smallest |Aeff|, with the correct movement direction dependent sign)
   ii. or a selected initial state (movement direction dependent)
  b. On the following times, the state (movement direction dependent) calculated during the cycle
5. Measurement of the pressures generated by the system from the pressure duct (i.e. whether the threshold pressure is exceeded)
6. Comparison of the system pressure obtained (in cycle n) with the threshold pressure value of the pressure
  a. if p_measured(n)>p_threshold
  An ADAPTATION ALGORITHM is used, the outcomes of which are:
   i. the state is maintained (n+1)
   ii. the effective area is increased (the next time, that is, n+1)
  b. p_measured<p_threshold→the effective area is decreased (the next time, that is, n+1)
   i. if already the smallest effective area→all chambers are connected to the low-pressure duct (State 8, Table 4/Connection 0, Table 2), or
   ii. the smallest state is allowed to exist and the energy is stored or used for an auxiliary or secondary function (recovery or conversion of energy by means of a turbine or hydraulic, motor into another form; auxiliary functions are e.g. flushing)
7. Return to point 2

The generation of overpressure (and overpower) is prevented with a pressure relief valve Should the active control system not function, the system will still be able to generate pressure and volume flow without external control with the check valve connections alone.

Movement Direction Detector

For example:

The chamber pressures of a small additional cylinder are measured, or

An additional cylinder may be fixed to the pressure generator in such a way that one of the piston rods of the pressure generator drives the piston of the additional cylinder; the additional cylinder does not have to participate in the actual pressure generation, but the aim is to generate a movement direction dependent pressure difference past the piston; the pressure energy of the additional cylinder can be used for the auxiliary functions of the wave power plant, such as for backwashing filters, etc.

The sign of the displacement sensor or speed sensor signal is identified, or

A power sensor 32 is connected to the piston rod (compression/pull is detected)

From the piston rod or a sensor piece fixed to it are measured strains (pull/compression), or A logic based on (mechanic and electric) limit switches Adaptation Algorithm This is used when the threshold pressure is exceeded; the effective area Aeff is increased only after a delay to avoid possible back and forth changing of states in certain cases. The solution is relevant in cases where the changing of states is based only on measuring the pressure of the pressure duct (the case of preferable instrumentation).

Delay, stabilisation period (how often tested whether current state is the best)

Time-based: the state is not changed until after the delay time has lapsed

Cycle-based: every Nth cycle (the state is changed, for example, only after the tenth cycle)

Is there any delay value (number of cycles or delay time) left, that is, is the delay value>0

If yes, the state is left unchanged (the effective area is not increased) and a return is made to the beginning of the main algorithm If no, the effective area is increased and the state memory is updated and a return is made to beginning of the main algorithm When using time-based stabilisation, the delay value (delay time) is updated before the beginning of a new cycle and when using cycle-based stabilisation, the delay value (number of delay cycles) is updated in connection with the changes of the direction of movement When using time-based stabilisation, the decrement is, for example, the periodic time of the coupling loop or its multiple When using cycle-based stabilisation, the decrement is, for example, one cycle Return to point 2 in the main algorithm (in Control example 1)

The block diagram of Control example 1 is shown in FIG. 9.

Control Example 2

1. The direction of movement is identified with a MOVEMENT DIRECTION DETECTOR, which may be, for example
a. electric
i. a position sensor
ii. a speed sensor
iii. an acceleration sensor
b. magnetic
c. hydraulic
d. mechanic
e. or the like
2. The state is connected
a. The first time
i. e.g. the smallest effective (movement direction dependent) state
ii. or an original default state (movement direction dependent)
b. On the following times, a state calculated by cycle (movement direction dependent)
3. Measurement of
a. the pressures generated by the system
i. from the pressure duct (that is, "is the threshold pressure exceeded")
b. Measurement of other quantities
i. chamber pressures, force (can be estimated from chamber pressures), speed of movement, etc.
ii. power and energy produced are calculated
iii. transferred to (movement direction specific) memory
4. The system pressure obtained (n) is compared with the threshold pressure value of the pressure
a. if p_measured(n)>p_threshold
i. the state is maintained (n+1) or (depends on an ADAPTATION ALGORITHM)
ii. the effective area is increased (the next time, that is, n+1)
b. p_measured<p_threshold→the effective area is decreased (the next time, that is, n+1)
i. if already the smallest effective area→all chambers are connected to the low-pressure duct, or
ii. the smallest area is allowed to exist and the energy is used for an auxiliary/secondary function (energy, flushing, etc.)
c. The energy/work (W_measured) produced is compared with the previous (movement direction specific) value (in the memory, n−1)
d. if p_measured(n)>p_threshold
i. and W_measured(n)>W_ measured(n−1)→the state is allowed to exist (n+1)
ii. and W_measured(n)<W_measured(n−1)→the previous state is connected (n+1)
e. if p_measured(n)>p_threshold
i. a smaller state is connected (n+1)
5. Return to point 1

The generation of overpressure (and overpower) is prevented with a pressure relief valve Should the active control system not function, the system will still be able to generate pressure and volume flow without external control with the check valve connections alone.

Adaptation Algorithm

In the beginning is determined the delay, cycle time, periodic time (how often tested whether current state is the best)

The delay time counter is updated with a time increment (or time decrement, if a subtractive counter is used) delta_t or The delay cycle counter is updated; change of state every Nth semicycle (tested e.g. on every tenth semicycle whether the change of state can be carried out)

The current state is read from the memory

The effective area is increased ($A_{eff}$)

if the area is already at maximum, the said state is maintained

Return to point 1 in the main algorithm (In Control example 2)

The operation of the torque pressure generator is described in greater detail in the following, with reference to FIGS. 10-16 of the drawings.

In a torque pressure generator solution based on a torque motor, the mechanical torque T is converted into hydraulic pressure, for example, in such a way that the rotary motion of the torsion shaft is directed at a wing in a cylindrical chamber which, when moving, aims to displace liquid (fluid) which is pressurised when the flow of liquid out of the chamber is restricted/regulated (for example, by means of valves, throttling or by guiding the flow to reverse osmosis membranes, the penetration of which requires exceeding a certain threshold pressure).

FIGS. 10-16 show a construction example of a torque pressure generator 1000 as diagrammatic views in principle. The torque pressure generator 1000 is comprised of two different cylinder units 1001 and 1002, which have different diameters D1 and D2, respectively, and different lengths L1 and L2, respectively. The construction comprises a torsion shaft 1003, 1004 extending through the cylinder units 1001, 1002, the torsion shaft having a diameter d1 in cylinder unit 1001 and d2 in cylinder unit 1002, respectively. On the part 1003 of the torsion shaft in cylinder unit 1001 are arranged two wings 1005 and two limiters 1006, and on the part 1004 of the torsion shaft in cylinder unit 1002 are arranged two wings 1007 and two limiters 1008, respectively. The wings and the limiters form four chamber spaces A1, A2, B1, B2, C1, C2, D1 and D2 in each cylinder unit. In the drawings, the limiters are shown separated by a profile line from the rest of the cylinder construction, but they are preferably made as an integrated whole with the rest of the cylinder construction. Similarly, the asymmetric torsion shaft 1003, 1004 shown in FIGS. 15 and 16 is shown with an added enlargement separated by a profile line, but an integrated torsion shaft construction is preferably in question.

There may be more wings and chambers than the above-mentioned two and four, for example, four wings, four limiters and eight pressure chambers. At a minimum, the solution may have one wing, one limiter and two chambers in a single cylinder unit.

In FIG. 13, the torsion shaft turns anti-clockwise and in FIG. 14 clockwise.

In FIG. 15, the torsion shaft turns anti-clockwise and in FIG. 16 clockwise.

Figure 1:
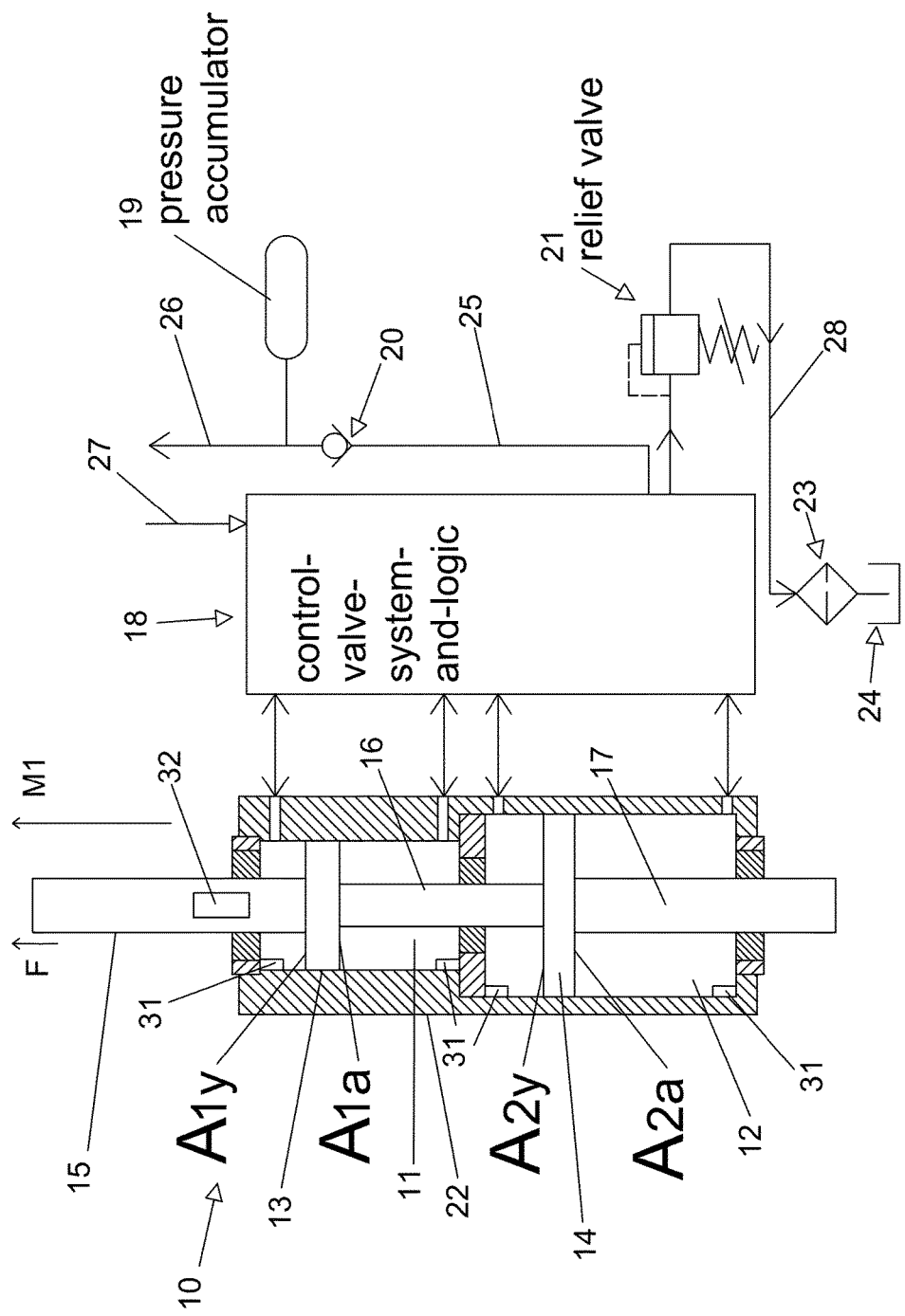
Figure 2:
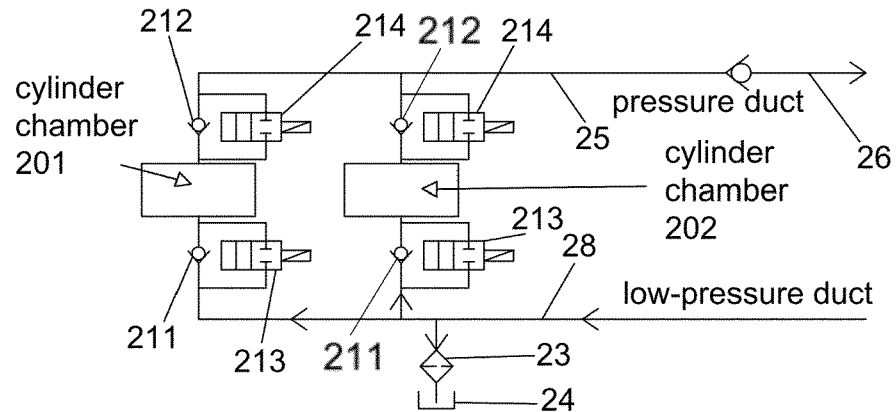
Figure 3:
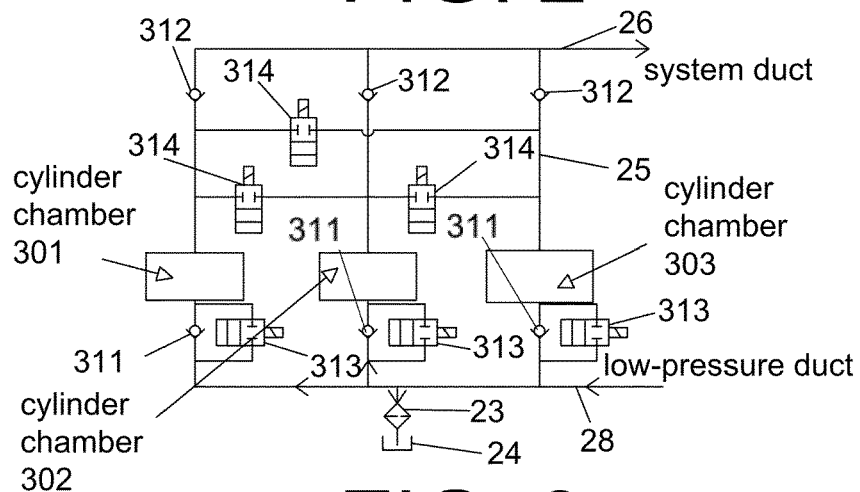
Figure 4:
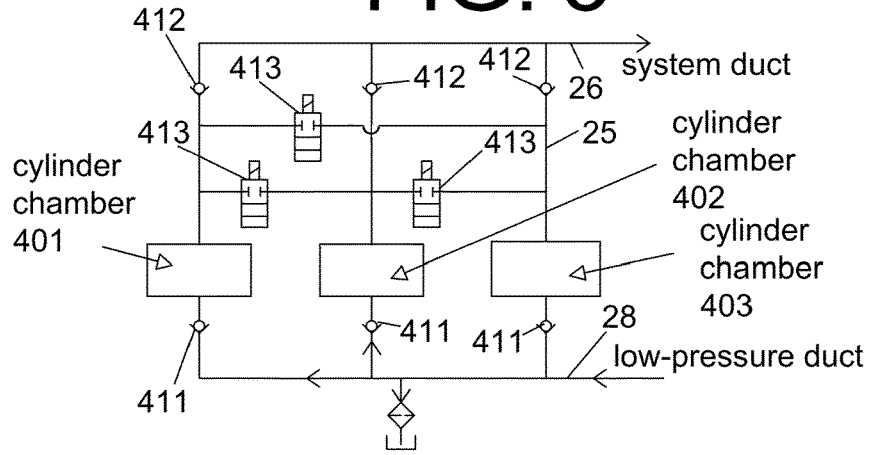
Figure 5:
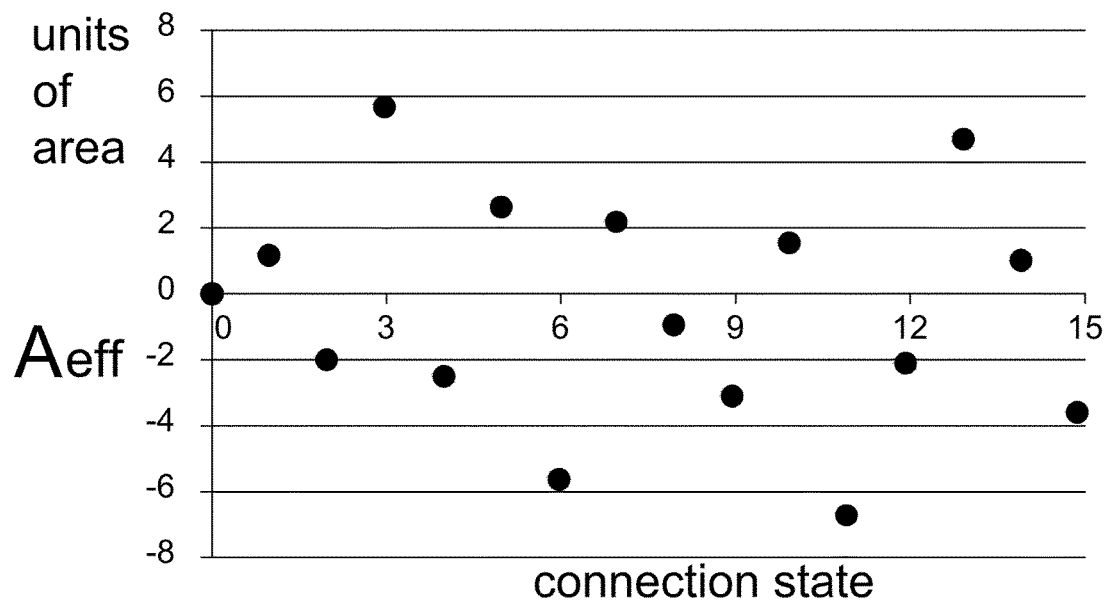
Figure 6:
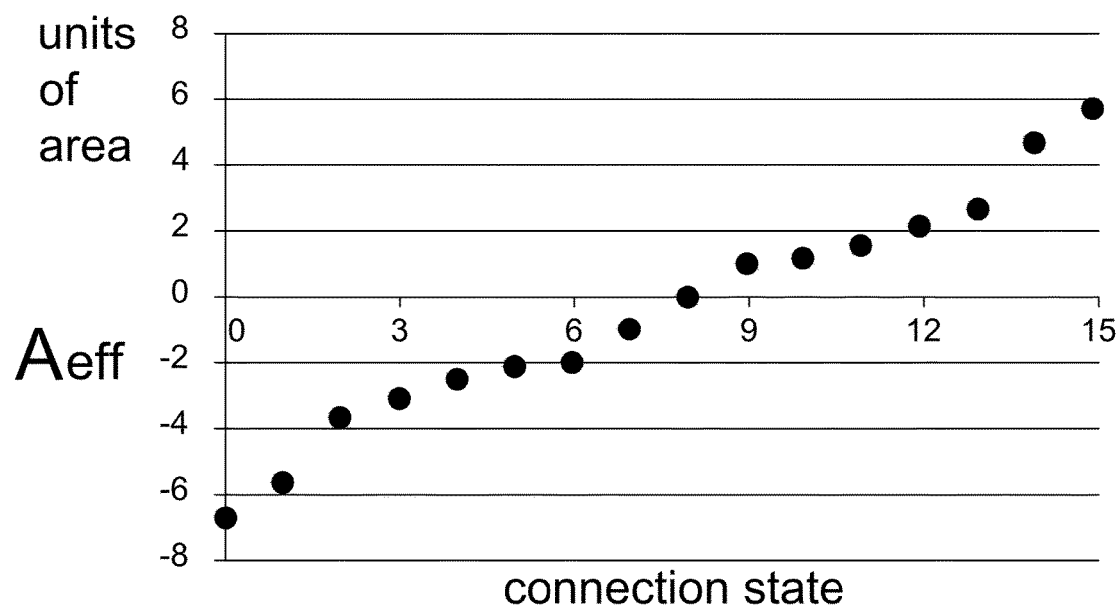
Figure 7A:
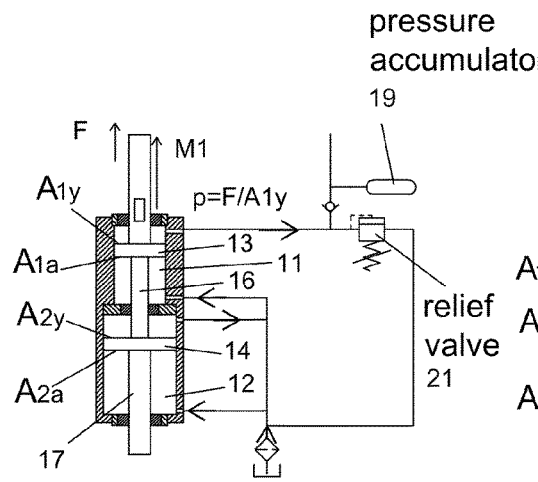
Figure 7B:
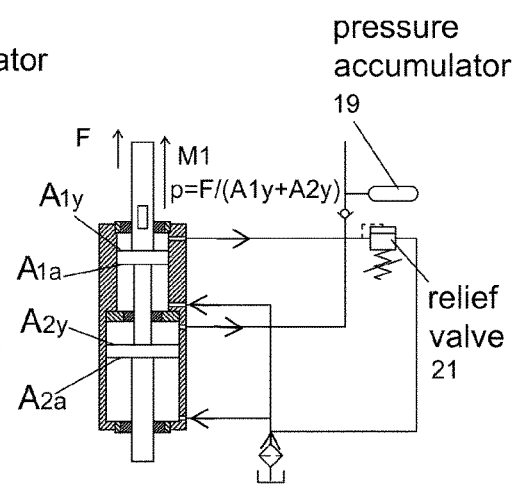
Figure 7C:
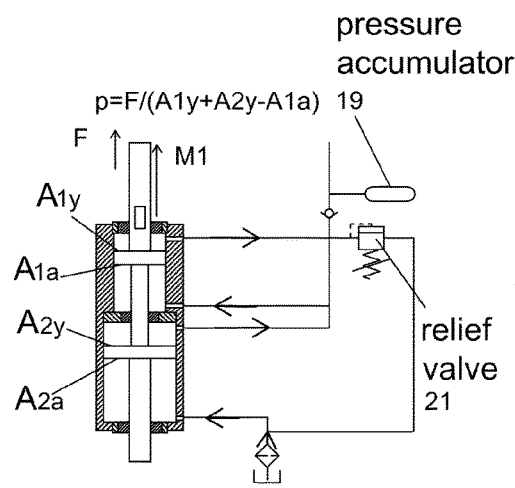
Figure 7D:
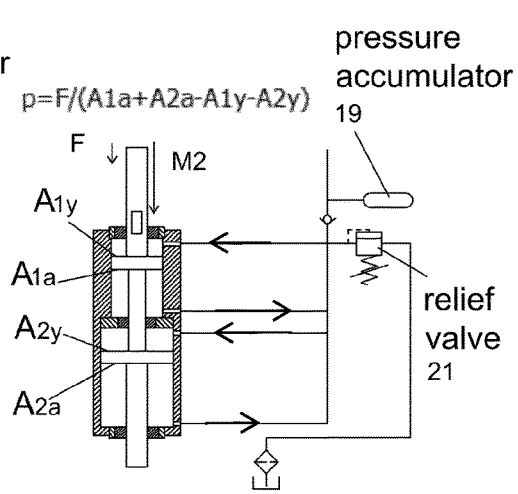
Figure 8:
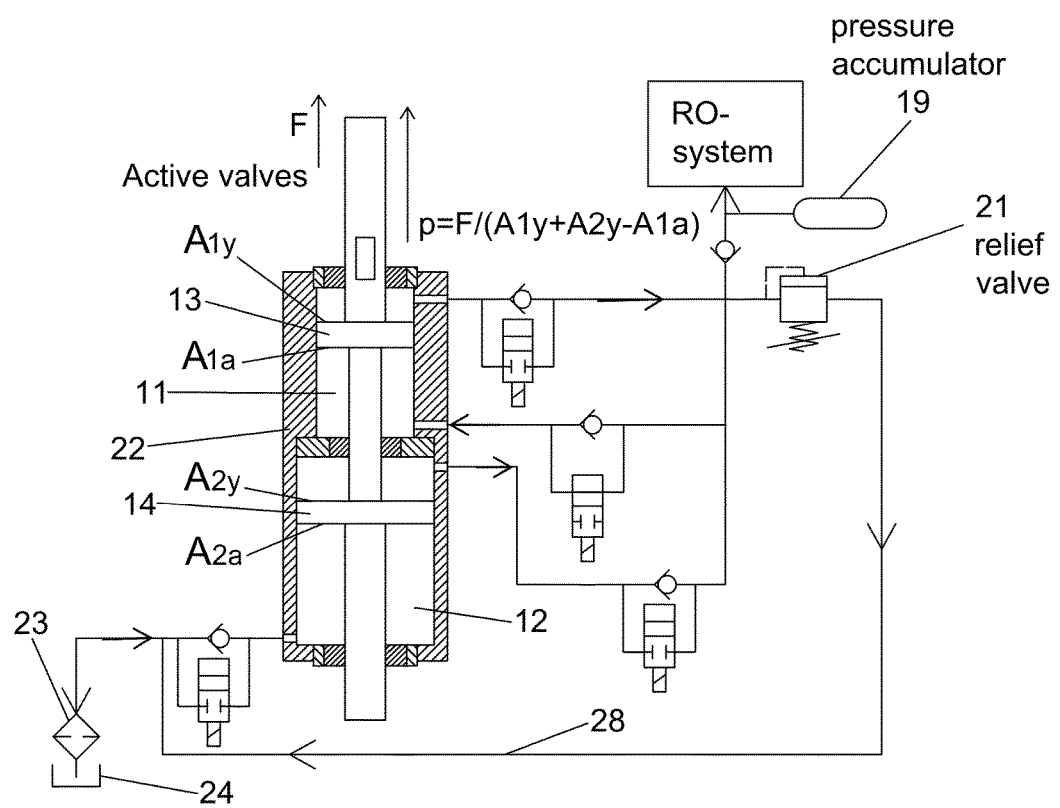
Figure 9:
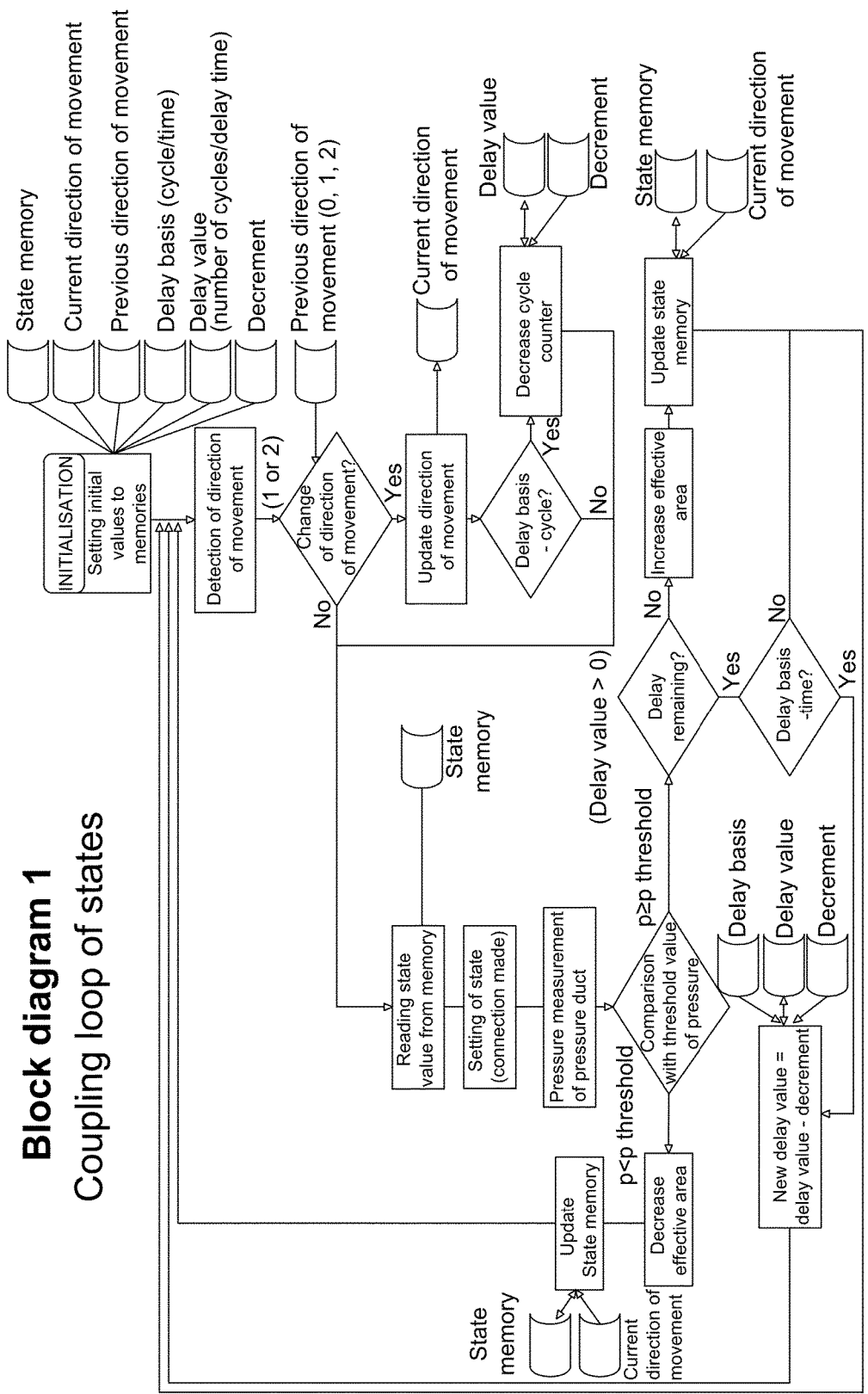
Figure 10:
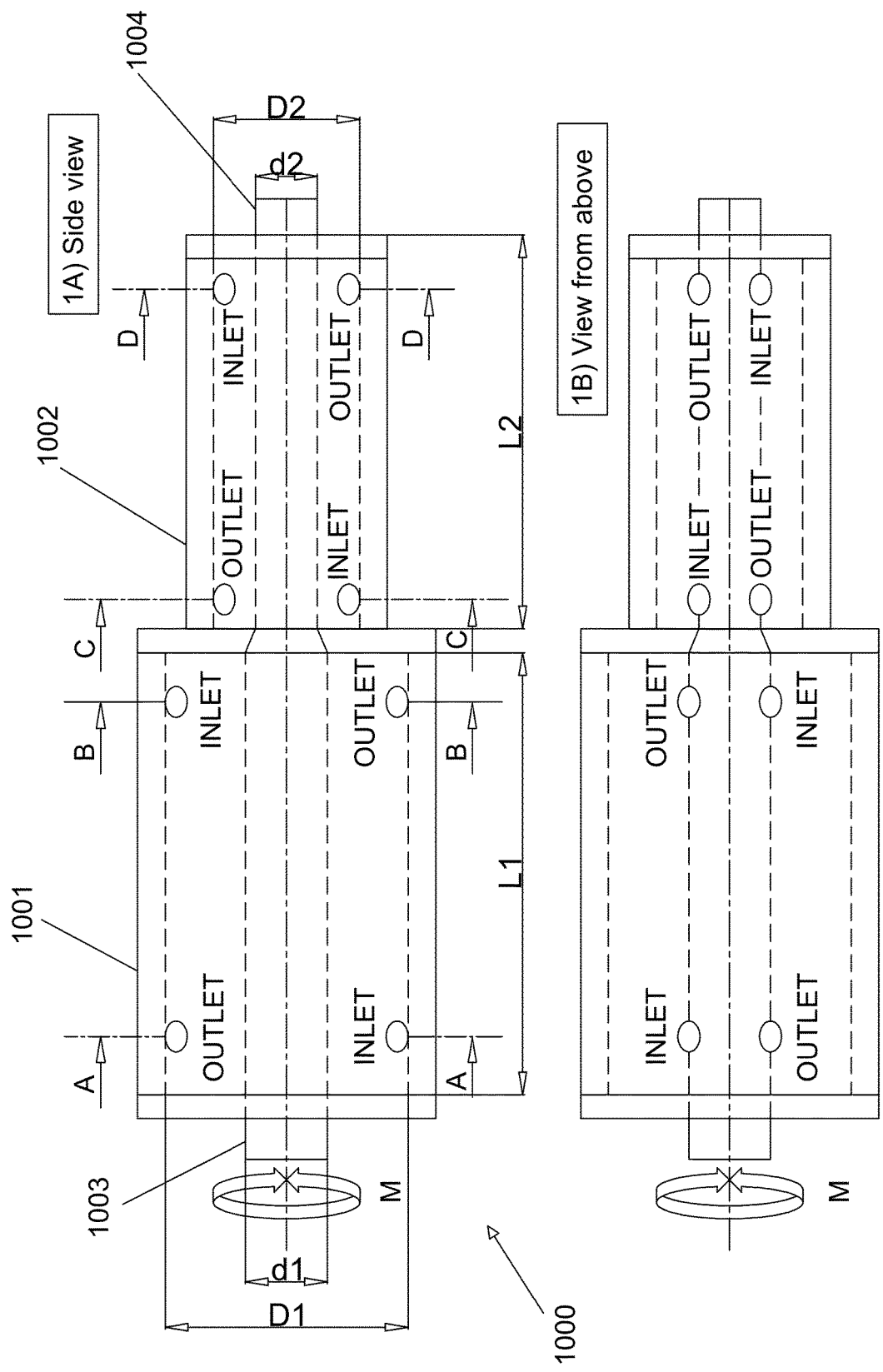
Figure 11:
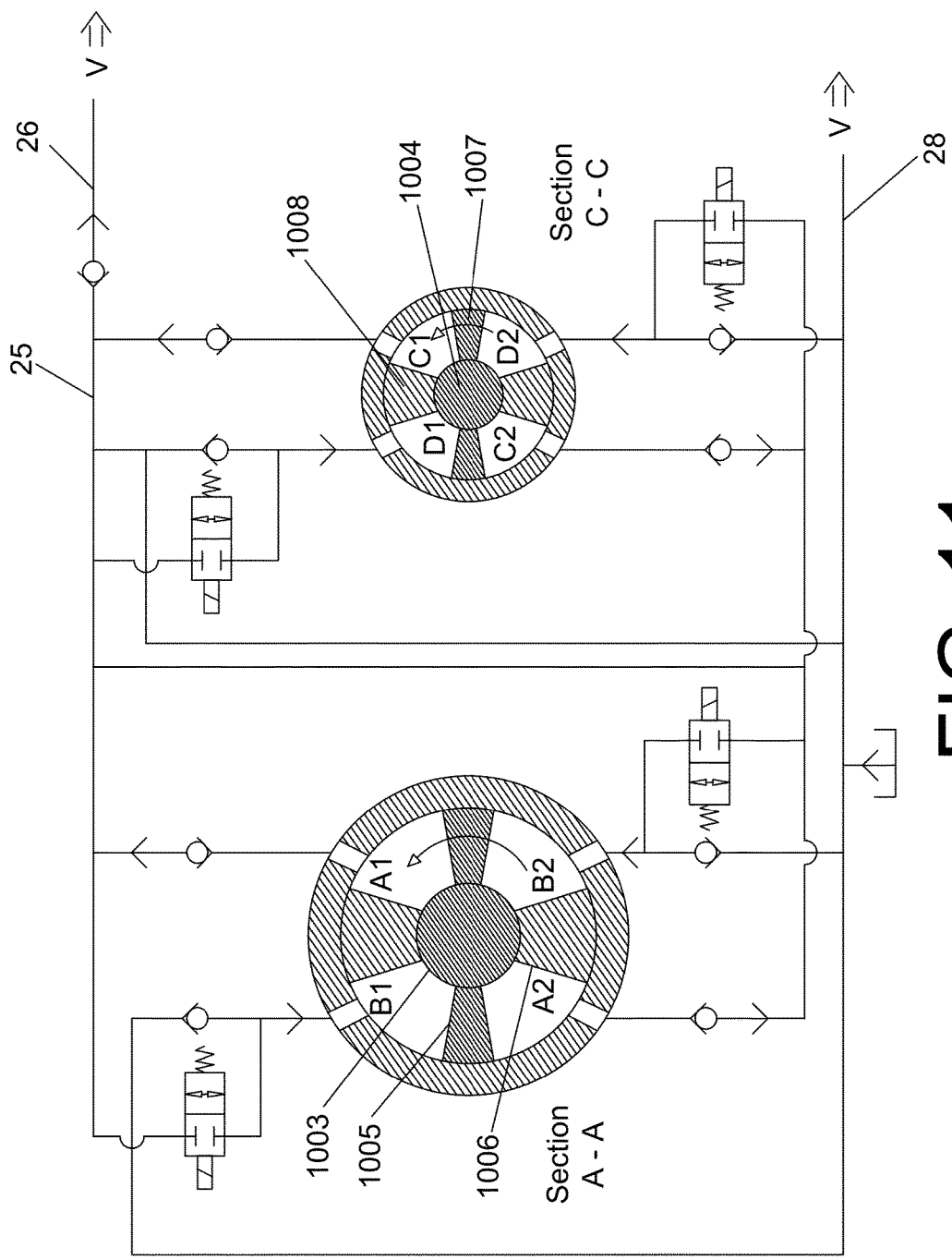
FIG. 11 shows sections A-A and C-C of FIG. 10 and the valve connections when the rotary motion of the torsion shaft 1003, 1004 is anti-clockwise. In the situation in FIG. 11, chambers A1, A2, C1 and C2 are pressurised and liquid flows into chambers B1, B2, D1 and D2 from the low-pressure duct 28.
Figure 12:
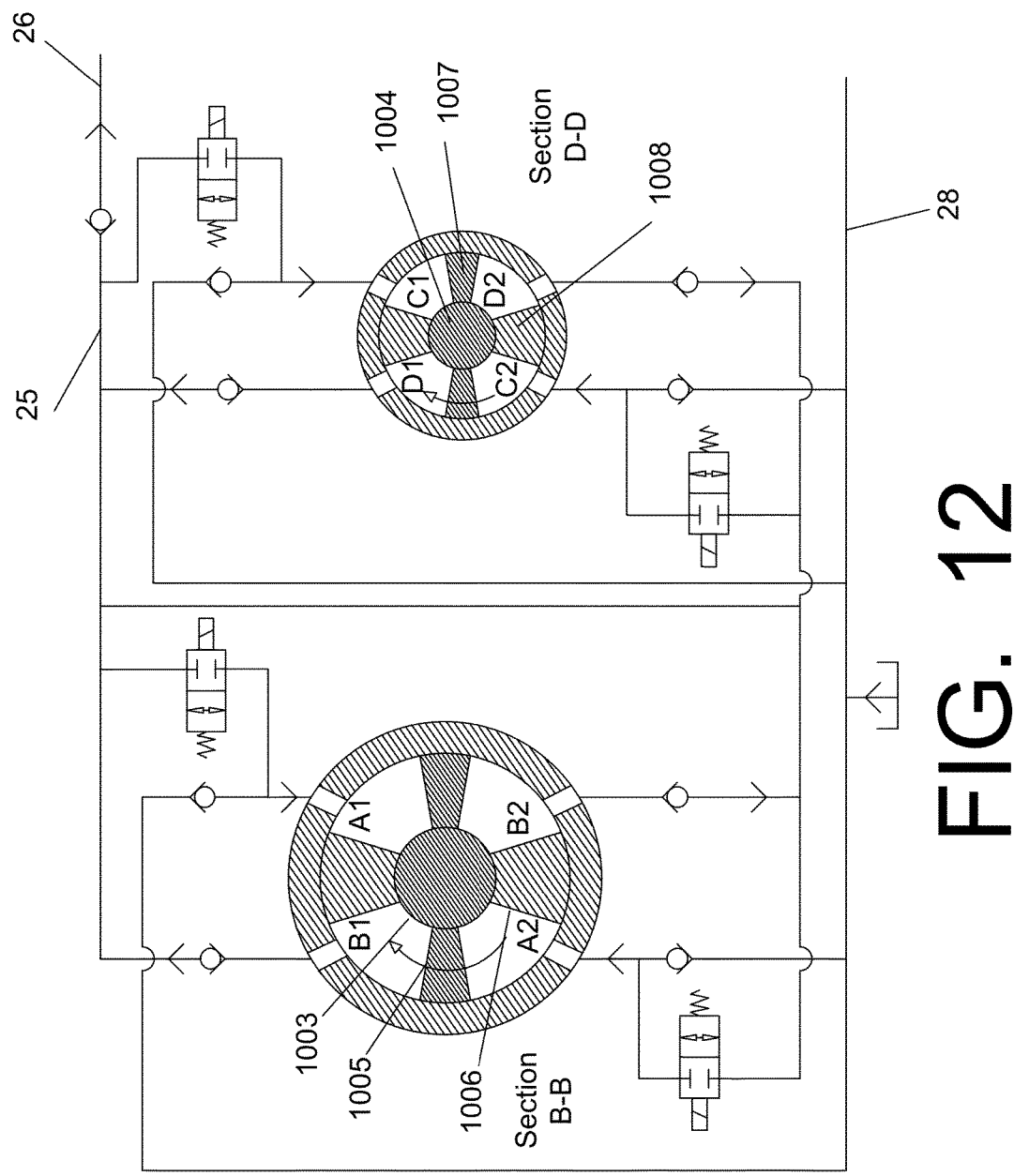
FIG. 12 shows sections B-B and D-D of FIG. 10 and the valve connections when the rotary motion of the torsion shaft is clockwise. In the situation in FIG. 12, chambers B1, B2, D1 and D2 are pressurised and liquid flows into chambers A1, A2, C1 and C2 from the low-pressure duct 28.
Figure 13:
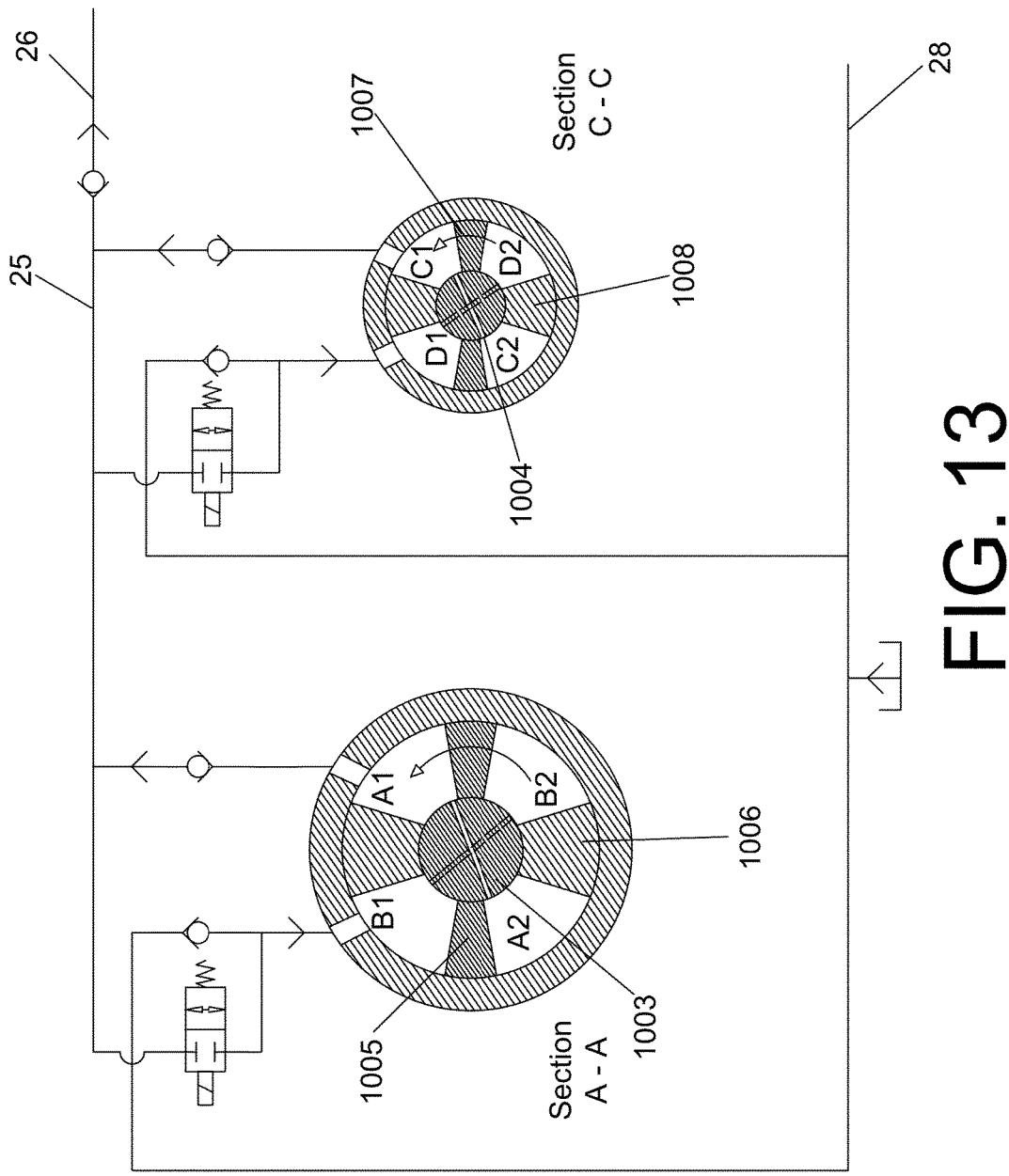
FIGS. 13 and 14 show the operation when the chambers A1 and A2 and B1 and B2 on the opposite side of the torsion shaft 1003, 1004 in cylinder unit 1001 and the chambers C1 and C2 and D1 and D2 in cylinder unit 1002 are combined, whereby the same pressure prevails in the combined chambers.
Figure 14:
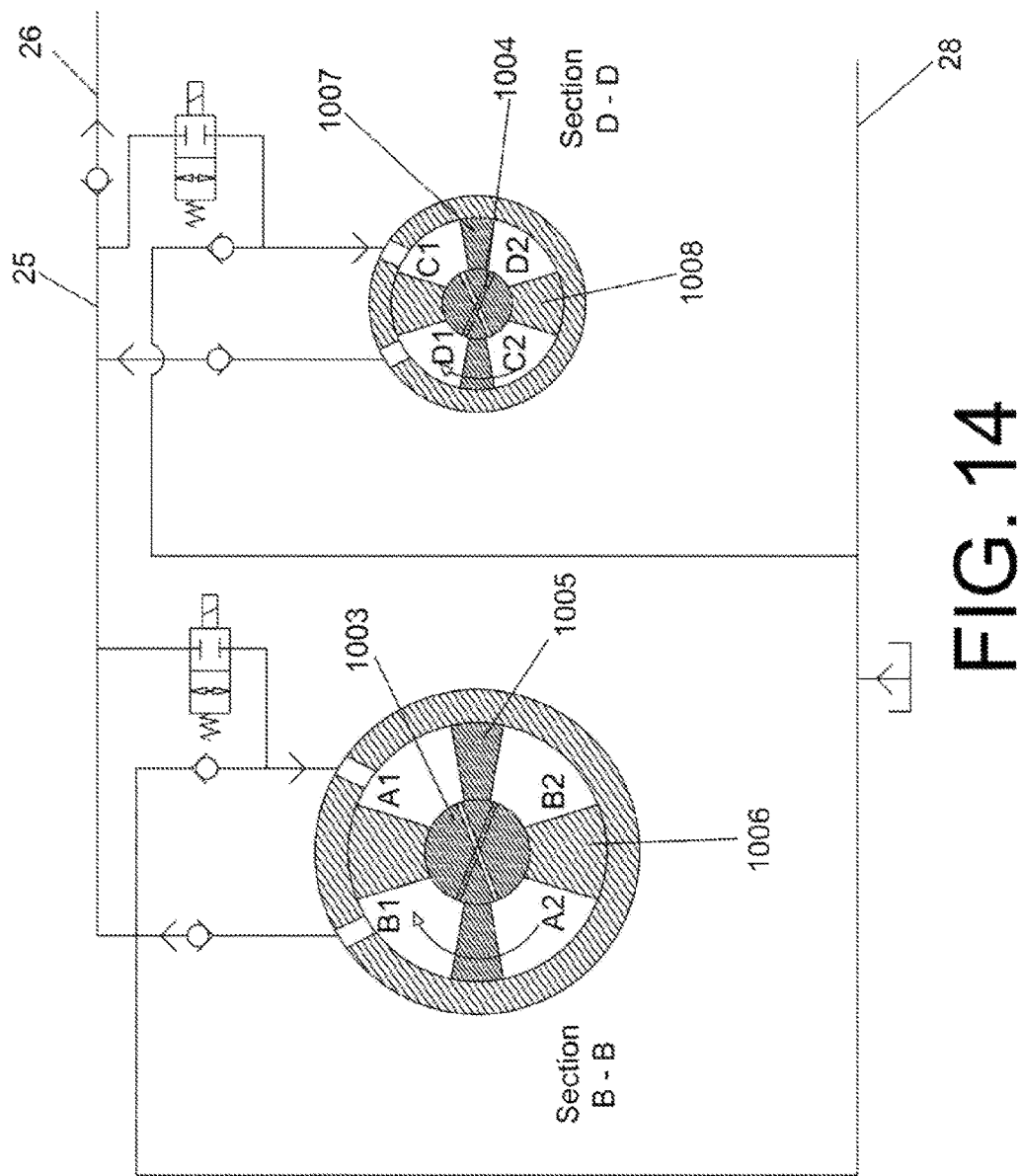
Figure 15:
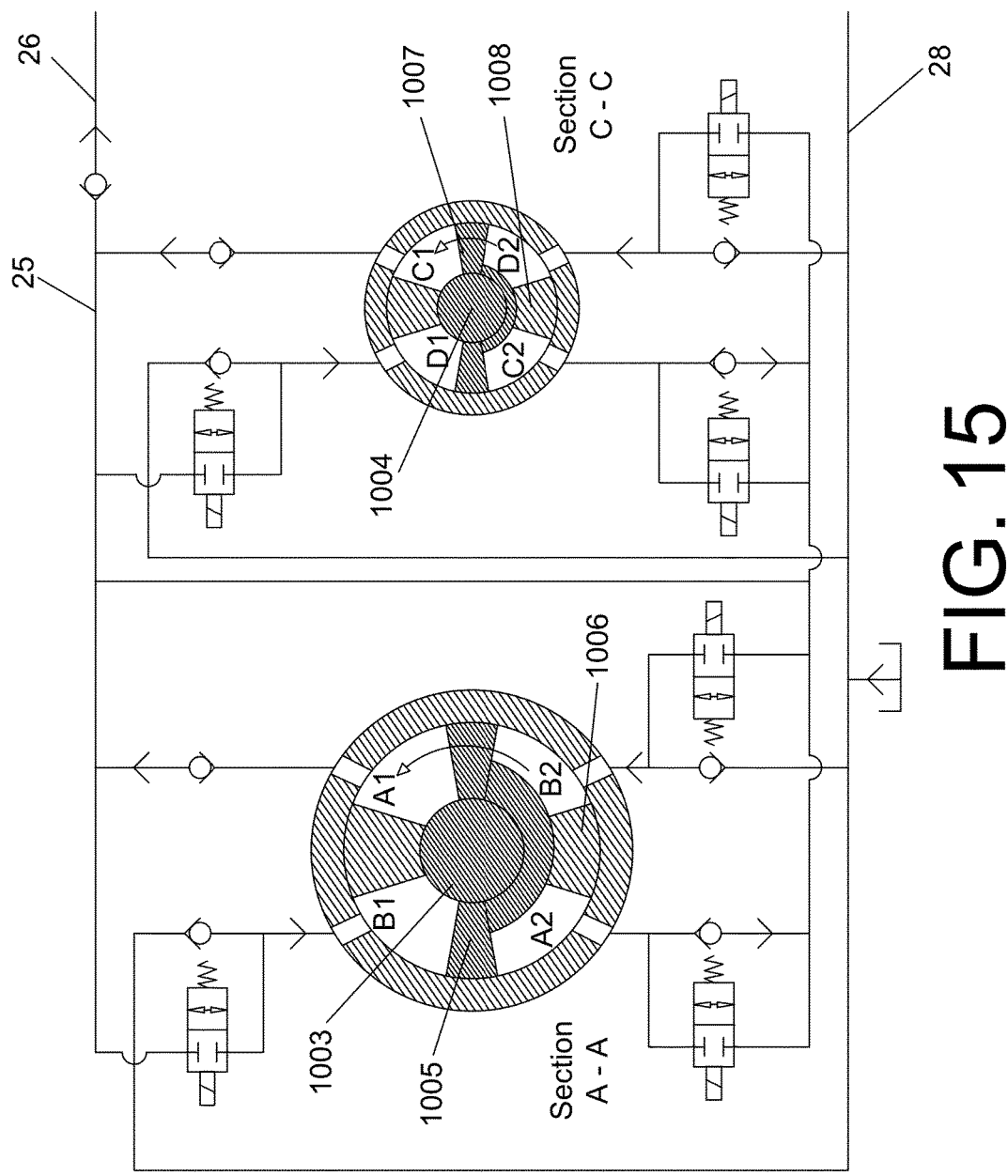
FIGS. 15 and 16 show an example which uses an asymmetric torsion shaft 1003, 1004, in which case chambers of different sizes can be connected to one another.
Figure 16:
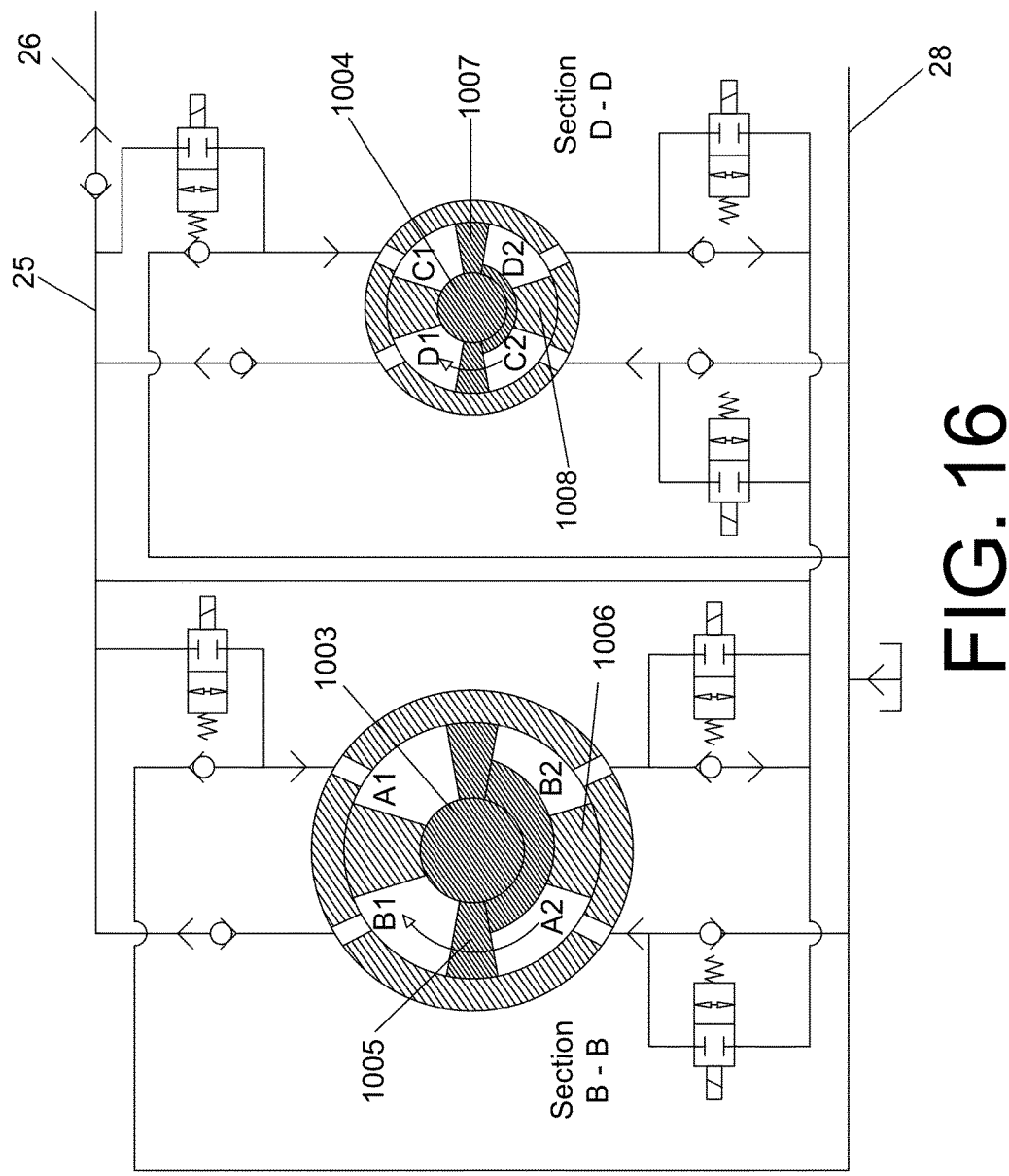

The radian volume of the torque pressure generator (that is, the volume which a wing would displace when rotating by a radian) determines the dependency of the driving moment exerted on the wing and the pressure. In a simple cylindrical torque pressure generator, the radian volume depends on the width of the wing (in the axial direction), on the distance of the tip and base of the wing from the centreline of the shaft and on the number of wings.

The effective displacement volume of the torque pressure generator (which compares with the effective areas of a linear pressure generator) is determined on the basis of how the pressure chambers of the torque pressure generator are connected to each other. This functions according to a similar principle as in a linear pressure generator. When connecting a pressure chamber volume increasing due to the rotary motion to a decreasing pressure chamber volume, the effective radian volume decreases from what it would be with the decreasing pressure chamber volume alone. The effective radian volume is obtained by subtracting the radian volume of the increasing pressure chamber volume from the radian volume of the decreasing pressure chamber volume. Similarly, when combining two or more pressure chambers decreasing due to the rotary motion, the effective radian volume is the sum of these radian volumes.

The invention claimed is:

1. An adaptive hydraulic pressure generator comprising at least two fluid chambers for systems in which an external mechanical driving force is variable, and acts on piston rods or on a body forming the fluid chambers and produces reciprocating motion between piston surfaces or displacement surfaces attached to the piston rods and the at least two fluid chambers, causing a fluid in the fluid chambers to be displaced via a high pressure duct to a system duct connected with an application or via a low pressure duct to a container, wherein the pressure generator includes a control-valve-system-and-logic including a first control valve system in the high pressure duct and a second control valve system in the low pressure duct, the control-valve-system-and-logic being arranged to connect any of the fluid chambers to any other of the fluid chambers by using the first control valve system or to connect any of the fluid chambers to the low pressure duct by using the second control valve system such that an effective area of the piston surfaces or displacement surfaces changes in accordance with the changes in the mechanical driving force exerted on the piston surfaces or displacement surfaces or the body forming the fluid chamber and such that the pressure produced by the pressure generator in the fluid supplied to the system duct exceeds a given threshold pressure as required by the application.

2. The adaptive hydraulic pressure generator as claimed in claim 1, wherein at least one of the first control valve system and the second control valve system is equipped with a control logic and a pressure sensor for measuring the pressure produced by the pressure generator in the system duct, on the basis of the measurement result given by the pressure sensor, the control logic performs a primary algorithm to connect any of the fluid chambers to any other of the fluid chambers by using the first control valve system or to connect any of the fluid chambers to the low pressure duct by using the second control valve system such that the effective area of the piston surfaces or displacement surfaces changes and such that the pressure produced by the pressure generator in the fluid supplied to the system duct exceeds the given threshold pressure.

3. The adaptive hydraulic pressure generator as claimed in claim 1, wherein on the body or piston surface or displacement surface or piston rod is arranged a pressure sensor for measuring the pressure in each fluid chamber.

4. The adaptive hydraulic pressure generator as claimed in claim 1, wherein on the piston rod connected to the piston surface or on the body forming the fluid chamber is provided a power sensor or an acceleration sensor.

5. The adaptive hydraulic pressure generator as claimed in claim 1, wherein the external mechanical driving force is generated by wave energy systems.

6. A reverse osmosis system or system for pumping fluid to a certain height comprising the pressure generator of claim 1.

7. A method for controlling an adaptive hydraulic pressure generator in systems in which an external mechanical driving force is variable, and acts on piston rods or on a body forming the fluid chambers and produces reciprocating motion between piston surfaces or displacement surfaces attached to the piston rods and the at least two fluid chambers, causing a fluid in the fluid chambers to be displaced via a high pressure duct to a system duct connected with an application or via a low pressure duct to a container, wherein in the method, the pressure produced by the pressure generator in the system duct is measured, wherein a measured pressure value is entered in a control logic of a control-valve-system-and-logic connected to the pressure generator and performing a primary algorithm, wherein based on the primary algorithm, the control-valve-system-and-logic including a first control valve system in the high pressure duct and a second control valve system in the low pressure duct, the control-valve-system-and-logic being arranged to connect, via the control logic, any of the fluid chambers to any other of the fluid chambers by using the first control valve system or to connect any of the fluid chambers to the low pressure duct by using the second control valve system such that an effective area of the piston surfaces or displacement surfaces changes and such that the pressure produced by the pressure generator in the fluid supplied to the system duct exceeds a given threshold pressure as required by the application.

8. The method as claimed in claim 7, wherein when the said pressure value exceeds the threshold pressure, the control logic also performs an adaptation algorithm.

9. The method as claimed in claim 7, wherein the direction of movement or speed of movement of the piston surfaces or displacement surfaces or the pressure in each fluid chamber is measured.

10. The method as claimed in claim 7, wherein the driving force exerted on the piston rods or on the body forming the fluid chamber is measured.

11. The method as claimed in claim 7, wherein in the method, when the pressure produced by the pressure generator is lower than the threshold pressure and the effective area of the piston surfaces is at a minimum value, all chambers are connected to a low-pressure duct directed to a secondary application or storage.

12. The method as claimed in claim 7, wherein the external mechanical driving force is generated by wave energy systems.

13. An adaptive hydraulic pressure generator comprising at least two fluid chambers for systems in which an external driving force is variable, wherein the pressure generator is arranged to cause a fluid in the fluid chambers to be displaced via a high pressure duct to a system duct connected with an application or via a low pressure duct to a container, wherein the pressure generator is implemented as a hydraulic torque pressure generator comprising at least one fluid chamber unit with two or more fluid chambers, the torque pressure generator being supplied a driving torque by a rotary motion; and wherein the pressure generator includes a control-valve-system-and-logic including a first control valve system in the high pressure duct and a second control valve system in the low pressure duct, the control-valve-system-and-logic being arranged to connect any of the fluid chambers to any other of the fluid chambers by using the first control valve system or to connect any of the fluid chambers to the low pressure duct by using the second control valve system such that an effective radian volume of the fluid chambers changes in accordance with the changes in the driving force producing a torque in the pressure generator that the pressure produced by the pressure generator in the fluid supplied via the high pressure duct and system duct to the application exceeds a given threshold pressure as required by the such application.

14. The adaptive hydraulic pressure generator as claimed in claim 13, wherein the external mechanical driving force is generated by wave energy systems.

* * * * *